(12) United States Patent
Yamada (10) Patent No.: US 8,675,218 B2
(45) Date of Patent: Mar. 18, 2014

(54) SYSTEM FOR MONITORING AND DISPLAYING PRINTER STATUS

(75) Inventor: Takafumi Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 778 days.

(21) Appl. No.: 12/568,159

(22) Filed: Sep. 28, 2009

(65) Prior Publication Data

US 2010/0079786 A1    Apr. 1, 2010

(30) Foreign Application Priority Data

Sep. 29, 2008    (JP) ................................ 2008-251946

(51) Int. Cl.
    *G06K 15/00*    (2006.01)
(52) U.S. Cl.
    USPC ............. 358/1.14; 358/437; 358/488; 400/74
(58) Field of Classification Search
    USPC ................................................ 358/1.1–3.29
    See application file for complete search history.

(56) References Cited

U.S. PATENT DOCUMENTS

| | | | |
|---|---|---|---|
| 6,806,975 B1 | 10/2004 | Fujita et al. | |
| 2002/0048476 A1* | 4/2002 | Kato | 400/70 |
| 2003/0077097 A1* | 4/2003 | Parry | 400/74 |
| 2004/0252329 A1* | 12/2004 | Sorenson | 358/1.15 |
| 2006/0232812 A1* | 10/2006 | Shimizu | 358/1.14 |

FOREIGN PATENT DOCUMENTS

| | | |
|---|---|---|
| JP | 10-228365 | 8/1998 |
| JP | 2008-102838 | 5/2008 |

* cited by examiner

*Primary Examiner* — Benny Q Tieu
*Assistant Examiner* — Marcellus Augustin
(74) *Attorney, Agent, or Firm* — Scully, Scott, Murphy & Presser PC (57) ABSTRACT

A data processor includes a communication unit, a customized data acquiring unit, a storing unit, a status data acquiring unit, and a display unit. The communication unit performs data communication with an electrical equipment. The customized data acquiring unit acquires customized data. The storing unit stores fixed data and the customized data acquired by the customized data acquiring unit. The customized data is correlated with the fixed data. The status data acquiring unit acquires status data from the electrical equipment via the communication unit. The display unit displays the fixed data and the customized data. The fixed data and the customized data are in association with the status data acquired by the status data acquiring unit.

21 Claims, 8 Drawing Sheets

| FIXED DATA |
|---|
| CUSTOMIZED DATA |

FIG. 4

| HEADER ID |
|---|
| ERROR STATUS CODE |
| USERNAME |
| RESOLUTION TIME |
| CUSTOMIZED DATA |

FIG. 5

| ERROR STATUS CODE | FIXED DATA FILE PATH | CUSTOMIZED DATA FILE PATH |
|---|---|---|
| 60001 | FILE01A | FILE01B |
| 60002 | FILE02A | FILE02B |
| ⋮ | | |
| 600XX | FILEXXA | FILEXXB |

FIG. 6

| ERROR STATUS CODE | CUSTOMIZED DATA FILE PATH |
|---|---|
| 60001 | HEADER ID |
| 60002 | HEADER ID |

SYSTEM FOR MONITORING AND DISPLAYING PRINTER STATUS

CROSS REFERENCE TO RELATED APPLICATION

This application claims priority from Japanese Patent Application No. 2008-251946 filed on Sep. 29, 2008. The entire content of each of the priority application is incorporated herein by reference.

TECHNICAL FIELD

The present invention relates to a technique for displaying data related to the status of an electrical equipment such as a printer.

BACKGROUND

Various printers have been proposed for dealing with unforeseen problems that occur when printing, such as when the printer runs out of paper, ink, or toner or when a paper jam occurs. When such an unforeseen problem occurs, the printer can display a message related to the problem on a display unit or, when capable of printing, can print a method of action to take in order to resolve the problem.

SUMMARY

However, in some cases, it is not sufficient to simply monitor the state of a printer and display the message on the printer or personal computer indicating a method of action to take when an unforeseen problem occurs with the printer. For example, even if instructions for reloading paper are displayed when the printer runs out of paper, the user may not know where the new paper is kept and, hence, may be unable to reload paper. It is also possible that the user may not understand the displayed instructions.

In view of the foregoing, it is an object of the present invention to provide a status monitoring program, printer, and printer status display system capable of directing a user to take appropriate action when an unforeseen problem occurs with the printer.

In order to attain the above object, the invention provides a data processor. The data processor includes a communication unit, a customized data acquiring unit, a storing unit, a status data acquiring unit, and a display unit. The communication unit is configured to perform data communication with an electrical equipment. The customized data acquiring unit is configured to acquire customized data. The storing unit is configured to store fixed data and the customized data acquired by the customized data acquiring unit. The customized data is correlated with the fixed data. The status data acquiring unit is configured to acquire status data from the electrical equipment via the communication unit. The display unit is configured to display the fixed data and the customized data. The fixed data and the customized data are in association with the status data acquired by the status data acquiring unit.

According to another aspect, the present invention provides an electrical equipment. The electrical equipment includes an electrical-equipment-side communication unit, a transmitting unit, a receiving unit, and an electrical-equipment-side storing unit. The electrical-equipment-side communication unit is configured to perform with a plurality of data processors. The first transmitting unit transmits status data to at least one of data processors. The receiving unit is configured to receive customized data from a second data processor. The second data processor transmits customized data when the second data processor receives the status data transmitted by the transmitting unit. The electrical-equipment-side storing unit stores the customized data received by the receiving unit. The transmitting unit is configured to transmit the customized data to a first data processor when the receiving unit receives the request command from the first data processor. The customized data transmitted by the second transmitting unit is in association with the status data.

According to still another aspect, the present invention provides a printing system. The printing system includes a plurality of data processor and an electrical equipment. The plurality of data processor includes a communication unit, a customized data acquiring unit, a storing unit, a status data acquiring unit, and a display unit. The communication unit is configured to perform data communication with an electrical equipment. The customized data acquiring unit is configured to acquire customized data. The storing unit is configured to store fixed data and the customized data acquired by the customized data acquiring unit. The customized data is correlated with the fixed data. The status data acquiring unit is configured to acquire status data from the electrical equipment via the communication unit. The display unit is configured to display the fixed data and the customized data. The fixed data and the customized data are in association with the status data acquired by the status data acquiring unit. The electrical equipment includes an electrical-equipment-side communication unit, a transmitting unit, a receiving unit, and an electrical-equipment-side storing unit. The electrical-equipment-side communication unit is configured to perform in data communication with the plurality of data processors. The transmitting unit transmits status data to at least one of data processors. The receiving unit is configured to receive customized data from a second data processor. The second data processor transmits customized data when the second data processor receives the status data transmitted by the transmitting unit. The electrical-equipment-side storing unit stores the customized data received by the receiving unit. The transmitting unit is configured to transmit the customized data to a first data processor when the receiving unit receives the request command from the first data processor. The customized data transmitted by the transmitting unit is in association with the status data.

According to still another aspect, the present invention provides a computer readable storage medium storing a set of program instructions installed on and executed by a computer for controlling a data processor. The program instructions includes communicating with an electrical equipment, first acquiring customized data, storing fixed data and the customized data acquired by the first acquisition, the customized data being correlated with the fixed data, second acquiring status data from the electrical equipment via the communication, and displaying the fixed data and the customized data, the fixed data and the customized data being in association with the status data acquired by the second acquisition.

According to still another aspect, the present invention provides a method for monitoring an electrical equipment status on a data processor. The method includes communicating with an electrical equipment, first acquiring customized data, storing fixed data and the customized data acquired by the first acquisition, the customized data being correlated with the fixed data, second acquiring status data from the electrical equipment via the communication and displaying the fixed data and the customized data, the fixed data and the customized data being in association with the status data acquired by the second acquisition.

DETAILED DESCRIPTION

Next, a preferred embodiment of the present invention for overcoming the problems in the prior art described above will be described in detail below while referring to the accompanying drawings. However, the preferred embodiment described below is merely one example of means for resolving the conventional problems, while the same technical idea may be incorporated into a variety of configurations.

Figure 1:
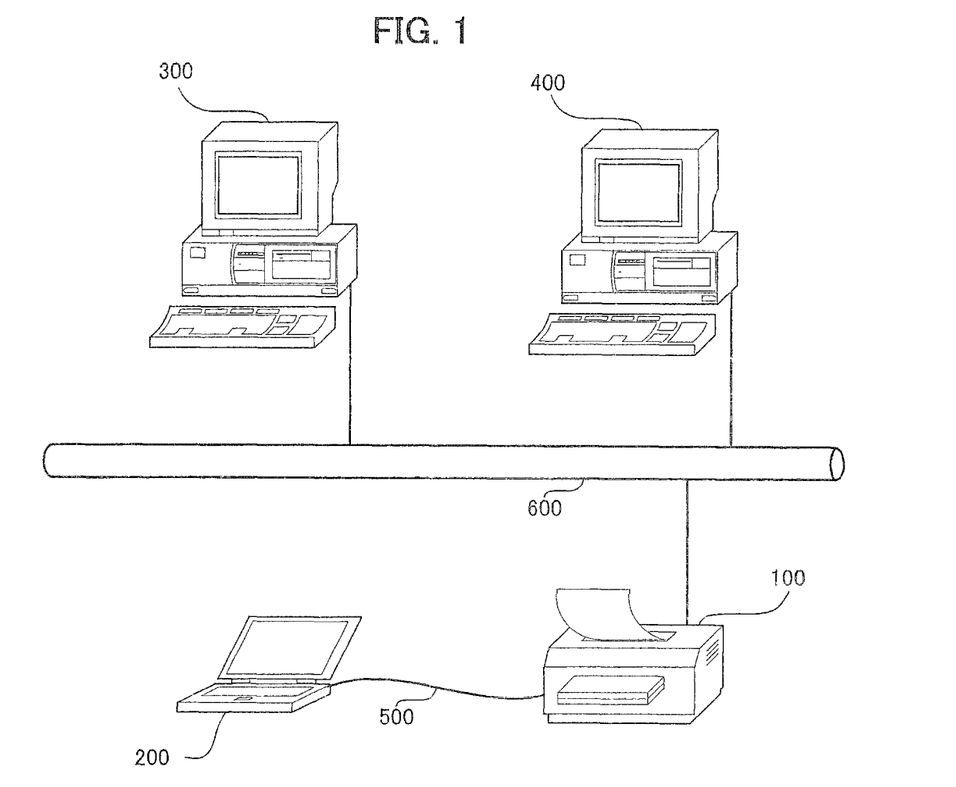
FIG. 1 is an explanatory diagram showing a printing system according to an embodiment of the present invention.

Two printing systems are shown in FIG. 1. One of the printing systems is configured of a printer 100 and a personal computer (hereinafter abbreviated to "PC") 200. In this system, the printer 100 is connected to the PC 200 by a universal serial bus (USB) cable 500 so that data can be exchanged therebetween (this type of connection will be referred to as a "USB connection"). The printer 100 and PC 200 may be interconnected according to another method than a USB connection, such as infrared communications or wireless USB. The other printing system is configured of the printer 100, and PCs 300 and 400. These components are interconnected via a local area network (LAN) cable 600 so as to be capable of exchanging data with each other. Instead of employing this wired LAN configuration, the components may be interconnected via a wireless LAN in the infrastructure mode, for example.

Figure 2:
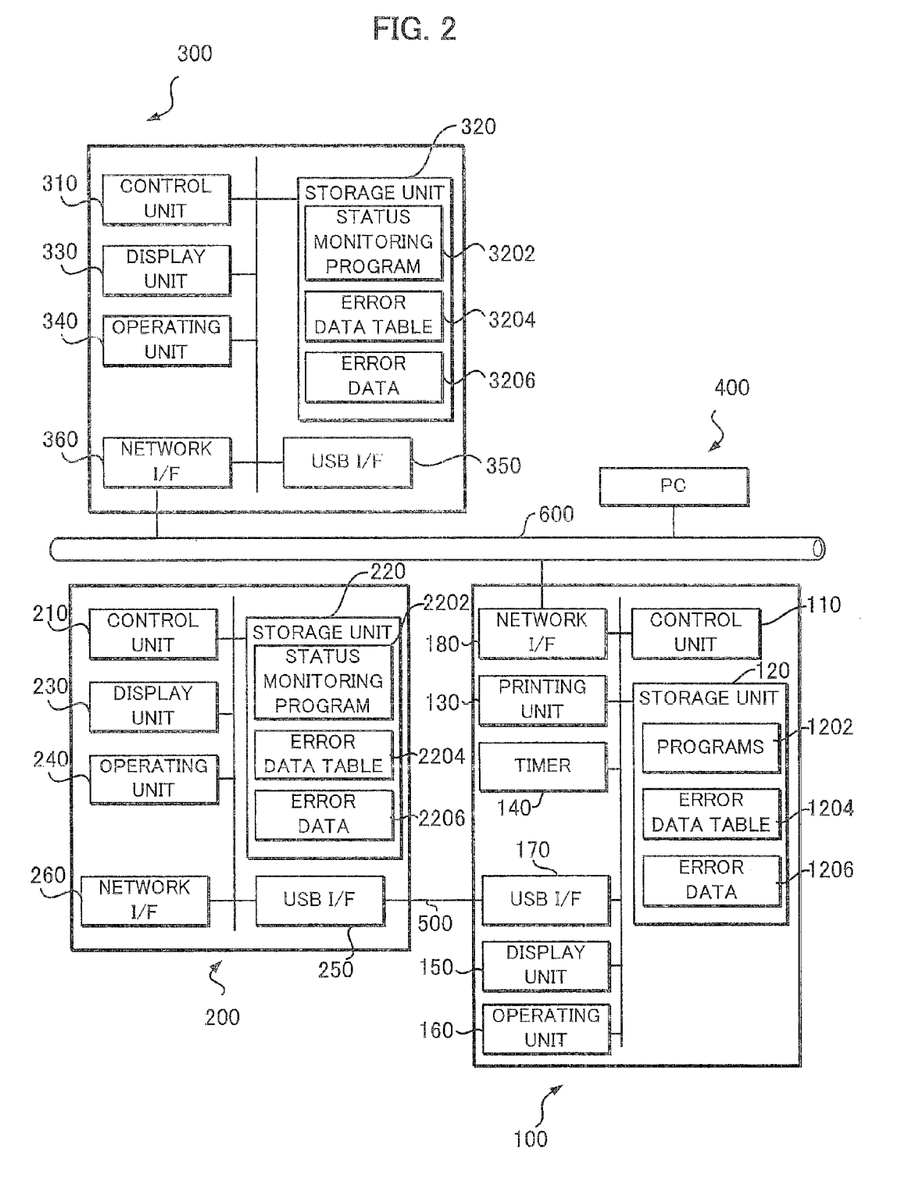
FIG. 2 is a block diagram showing the construction of components in the printing system.

As shown in FIG. 2, the printer 100 includes a control unit 110 for controlling overall operations of the printer 100, and a storage unit 120. Although not shown in the drawing, the control unit 110 includes a CPU for executing operations, a ROM for storing various programs, and a RAM serving as a work area for processes executed by the CPU. The storage unit 120 stores various programs 1202 for implementing various processes described later, an error data table 1204 and error data 1206 used in the implementation of these processes. The storage unit 120 may be configured of a hard disk or nonvolatile memory (EEPROM), for example. The CPU of the control unit 110 implements the processes mentioned above by executing programs stored in the ROM or the programs 1202 stored in the storage unit 120. At this time, various data including data stored in the storage unit 120 is loaded into and preserved in RAM. The CPU accesses the RAM to implement processes with this data. Therefore, the CPU implements the processes by loading various programs from ROM and the like and executing the programs in RAM.

The printer 100 also includes a printing unit 130 for executing printing operations with print data, a timer 140 for measuring elapsed time, a display unit 150 for displaying various message, and an operating unit 160 serving as a data input interface for implementing functions. The operating unit 160 includes arrow keys, a numeric keypad for inputting alphanumeric characters, and an Enter button. The printer 100 additionally includes a USB interface 170 (hereinafter abbreviated to USB I/F) for connecting a USB cable, and a network interface 180 (hereinafter abbreviated to network I/F) for connecting the printer 100 to the LAN cable 600. These interfaces allow the printer 100 to receive print data from and to exchange various other data with other devices in the printing system.

Next, the PC 200 will be described. The PC 200 includes: a control unit 210 for performing overall control of the PC 200 and having a CPU, ROM, and RAM; a storage unit 220 storing a status monitoring program 2202, an error data table 2204, and error data 2206 for implementing processes described later; and an operating unit 240 configured of a keyboard and mouse and serving as an input interface that allows users to input various data for use when executing programs. The storage unit 220 may be configured of a hard disk, for example. The CPU of the control unit 210 implements various processes by executing the status monitoring program 2202 stored in the storage unit 220 in RAM using the error data table 2204 and the error data 2206 stored in the storage unit 220 and data inputted via the operating unit 240, for example.

The PC 200 also includes a display unit 230 for displaying various message, a USB I/F 250, and a network I/F 260. Although the PC 200 is equipped with the network I/F 260 in this example, the PC 200 is not connected to the LAN cable 600 in the configurations shown in FIGS. 1 and 2.

Similar to the PC 200, the PC 300 also includes a control unit 310; a storage unit 320 storing a status monitoring program 3202, an error data table 3204, and error data 3206; a display unit 330; an operating unit 340; a USB I/F 350; and a network I/F 360. The construction of the PC 400 is identical to that of the PC 300. Since the components of the PCs 300 and 400 are the same as those described for the PC 200, a detailed description of the PCs 300 and 400 will not be repeated. However, the PCs 300 and 400 are connected to the LAN cable 600 via the network I/F 360, rather than being connected to the printer 100 directly using a USB cable connected to the USB I/F 350.

Figure 3:
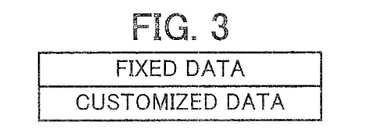
FIG. 3 is an explanatory diagram conceptually illustrating error data.

The error data 1206, 2206, and 3206 are each configured of fixed data and customized data as shown in FIG. 3. The fixed data refers to data associated in advance with individual types of status indicating when an error has occurred in the printer (hereinafter referred to as "error status") and describes predetermined steps to take in response to each error. For example, when the printer runs out of paper, the fixed data includes the message "The printer is out of paper. Please reload paper to continue." Customized data, on the other hand, is data that a user inputs in a dialog box (see FIG. 7, for example) displayed in processes described later based on fixed data. The customized data includes a unique message associated with the specific environment in which the printer 100 is used. For example, if the error status indicates the printer is out of paper, the customized data may include the message "10 boxes of paper purchased on 8/26/2008. Stored in locker on the $3^{rd}$ floor." or "Purchase more paper from http://www.paper123.com/. Login ID is aaaa; password is bbbb."

The fixed data and customized data are stored as files in the storage units 120, 220, and 320 of the respective devices (hereinafter, files holding fixed data will be referred to as "fixed data files," while files holding customized data will be referred to as "customized data files"). Using the PC 200 as an example, the fixed data file is stored in the storage unit 220 as the error data 2206 together with the status monitoring program 2202 when installing the status monitoring program 2202, for example. The error data 1206 stored in the storage unit 120 of the printer 100 is used in the second process described later.

Figure 4:
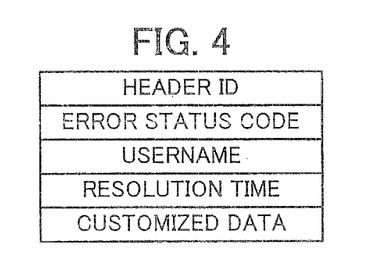
FIG. 4 is an explanatory diagram showing the structure of content in a customized data file.

As shown in FIG. 4, each customized data file includes a unique header ID for identification, an error status code identifying the type of error, a user name indicating the user that inputted the customized data, a resolution time indicating the time required to resolve the error, and customized data including a message such as that described above. The resolution time will be described later in greater detail in the second process.

Figure 5:
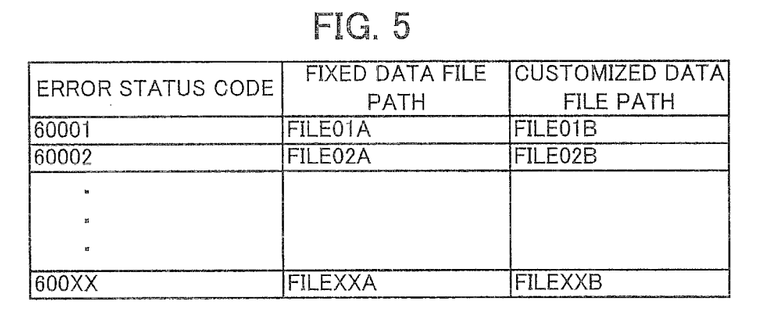
FIG. 5 is an explanatory diagram showing the content of an error data table stored on a personal computer.

As shown in FIG. 5, the error data table 2204 (or 3204) stored in the PC 200, 300, and 400 correlates error status codes with paths indicating where the fixed data files are stored, and paths indicating where the customized data files are stored. For example, error status code "60001" is correlated with the path for fixed data file "File 01A" and the path for customized data file "File 01B."

If error status code "60001" is the code indicating an "out-of-paper" error, File 01A includes fixed data constituting the message in the above example, while File 01B includes customized data constituting the message in the above example.

Figure 6:
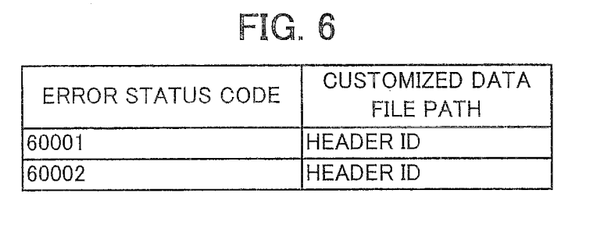
FIG. 6 is an explanatory diagram showing the content of an error data table stored on a printer.

FIG. 6 shows the error data table 1204 stored in the storage unit 120 of the printer 100. The error data table 1204 correlates error status codes with header IDs included in the customized data files (see FIG. 4). The error data table 1204 is used in the second process described later.

Figure 7:
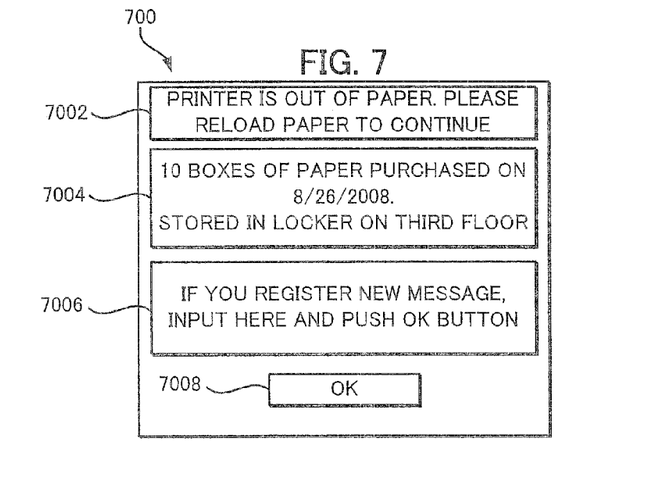
FIG. 7 is an explanatory diagram showing a dialog box displayed on the personal computer in a first process according to the embodiment of the present invention.

FIG. 7 shows a dialog box 700 displayed on the display unit 230 of the PC 200 when the control unit 210 executes the status monitoring program 2202. The dialog box 700 is displayed on the display unit 230 when the PC 200 receives an error status code from the printer 100. The printer 100 includes various sensors for detecting its own status and transfers an error status code when the detected status indicates that an error has occurred. At this time, the control unit 210 of the PC 200 receives error status codes from the printer 100 via the USB I/F 250, while the PCs 300 and 400 receive error status codes via the network I/F 360.

The dialog box 700 includes a fixed data display box 7002 displaying a message based on the fixed data in the fixed data file, a customized data display box 7004 displaying a message based on the customized data in the customized data file, a customized data input box 7006 in which the user may input new customized data, and an OK button 7008. When a path for a customized data file is recorded in the error data table 2204 in association with the error status code which is corresponding to the fixed data displayed on the fixed data display box 7002, the control unit 210 read the customized data file indicated by this path into RAM and display data from the file in the customized data display box 7004. In other words, no data is displayed in the customized data display box 7004 if a path for a customized data file is not recorded in association with the error status code which is corresponding to the fixed data displayed on the fixed data display box 7002. This process will be described later in greater detail.

If the user inputs desired data in the customized data input box 7006 via the operating unit 240 and subsequently presses the OK button 7008, a customized data file including the newly inputted customized data is created and recorded in the error data table 2204 in association with the error status code that triggered displaying of the dialog box 700. If a customized data file is already associated with this error status code, the newly inputted customized data is added to the existing customized data file and the username in the customized data file is updated to the latest user.

Next, descriptions will be given for a first process executed on the PC 200, which is connected to the printer 100 via a USB cable, and a second process executed by the PC 300 (or 400), which is connected to the printer 100 via the LAN cable 600.

First Process

The control unit 210 automatically begins executing the status monitoring program 2202 after the power of the PC 200 is turned on and the PC 200 starts up. Once the status monitoring program 2202 is properly started, in S100 of FIG. 8 the control unit 210 determines whether or not the PC 200 can communicate with the printer 100 via the USB I/F 250 according to a USB connection. If the control unit 210 determines that communication is not possible (S100: NO), the control unit 210 ends the current process (quits the status monitoring program 2202). The PC 200 may not be able to communicate with the printer 100 if the power of the printer 100 is off, for example. However, if the PC 200 can communicate with the printer 100 (S100: YES), in S102 the control unit 210 acquires the printer status from the printer 100 via the USB I/F 250. The control unit 210 acquires the printer status of the printer 100 by issuing a status request command described later and subsequently controlling the USB I/F 250 to receive the printer status transmitted by the printer 100.

After acquiring the printer status via the USB I/F 250 in S102, in S104 the control unit 210 determines whether or not this printer status indicates an error. This determination is made based on whether or not the printer status includes an error status code, such as that shown in FIG. 5. If the printer status does not indicate an error (S104: NO), the control unit 210 returns to S102.

However, if the printer status indicates an error (S104: YES), in S106 the control unit 210 identifies the record in the error data table 2204 corresponding to the error status code included in the printer status, reads the fixed data file into RAM based on the path of the fixed data file recorded in the error data table 2204 in association with the identified error status code, and displays the fixed data in this file in the fixed data display box 7002 (see FIG. 7). Further, if a path for a customized data file is recorded in the error data table 2204 in association with the identified error status code, in S106 the control unit 210 reads the customized data file into RAM based on the path of the customized data file and displays customized data in the file in the customized data display box 7004. If the identified error status code relates to the "out-of-paper" error, the message "The printer is out of paper. Please reload paper to continue." is displayed in the fixed data display box 7002, and the message "10 boxes of paper purchased on 8/26/2008. Stored in locker on the 3$^{rd}$ floor." in the customized data display box 7004 as described earlier.

In S108 the control unit 210 determines whether or not the customized data input box 7006 is set. That is, the control unit 210 determines whether or not the user has inputted new customized data into the customized data input box 7006 and has subsequently pressed the OK button 7008. If new customized data has not been inputted into the customized data input box 7006 (S108: NO), the control unit 210 jumps to S114. However, if new customized data has been inputted into the customized data input box 7006 (S108: YES), in S110 the control unit 210 saves a customized data file including the newly inputted customized data in the storage unit 220 as the error data 2206 and in S112 updates the error data table 2204 to reflect the new customized data.

Here, the process performed in S110 and S112 will be described using a specific example. In this example, the error status code included in the printer status acquired in S102 will be the code indicating an "out-of-paper" error, and a path indicating a customized data file is not recorded in the error data table 2204 in association with this error status code. In S110 the control unit 210 saves a customized data file including customized data newly inputted in the customized data input box 7006, such as "10 boxes of paper purchased on 8/26/2008. Stored in locker on the 3$^{rd}$ floor." in the storage unit 220 as the error data 2206. At this time, the control unit 210 records the prescribed data shown in FIG. 4 in the customized data file. In S112 the control unit 210 records a path indicating where the customized data file including the above message is stored in the storage unit 220. The path is recorded in a record in the error data table 2204 related to the error status code for "out-of-paper."

Next, the process in S110 and S112 will be described for an example in which the status code included in the printer status acquired in S102 is an error status code indicating "out-of-paper," and a path for the customized data file including the customized data "10 boxes of paper purchased on 8/26/2008. Stored in locker on the 3$^{rd}$ floor." is already recorded in the error data table 2204 in association with this error status code. If the new customized data "Purchase more paper from http://www.paper123.com/. Login ID is aaaa; password is bbbb." is inputted into the customized data input box 7006 at this time, in S110 the control unit 210 adds this new customized data to the existing customized data to create the customized data "Purchase more paper from http://www.paper123.com/. Login ID is aaaa; password is bbbb./ 10 boxes of paper purchased on 8/26/2008. Stored in locker on the 3$^{rd}$ floor." and saves a customized data file including this data in the storage unit 220 as the error data 2206 (overwrites the existing data). At this time, the control unit 210 updates the username in the customized data file to the username of the user that inputted the new customized data (see FIG. 4).

In S112 the control unit 210 records the path of the customized data file including the above message indicating where the file is stored in the storage unit 220. This path is recorded in a record of the error data table 2204 in association with the error status code for "out-of-paper." Normally, the path is simply overwritten without any change.

In S114 the control unit 210 determines whether or not a command to quit the status monitoring program 2202 has been inputted via the operating unit 240. If a quit command has been inputted (S114: YES), the control unit 210 ends the current process. However, if a quit command has not been inputted (S114: NO), the control unit 210 returns to S100 and continues the process described above.

In the first process, the control unit 210 displays the dialog box 700 (see FIG. 7) that includes a message based on fixed data displayed in the fixed data display box 7002. The user can input customized data in the customized data input box 7006 related to the fixed data displayed in the fixed data display box 7002, at which time the control unit 210 saves a customized data file including this inputted customized data in the storage unit 220 as the error data 2206 (S110 of FIG. 8). When a customized data file is already stored in the storage unit 220 as the error data 2206, the control unit 210 displays the customized data from the customized data file in the customized data display box 7004 together with the fixed data displayed in the fixed data display box 7002 (S106 of FIG. 8). Hence, when an error occurs more than once, the PC 200 can display specific useful data on steps previously taken to resolve the error in the customized data display box 7004, enabling the user to quickly take appropriate steps in response to the error.

Second Process

As described above, the second process is executed by the PC 300 (or 400) connected to the printer 100 via the LAN cable 600. The following description will use the PC 300 as an example.

Figure 9:
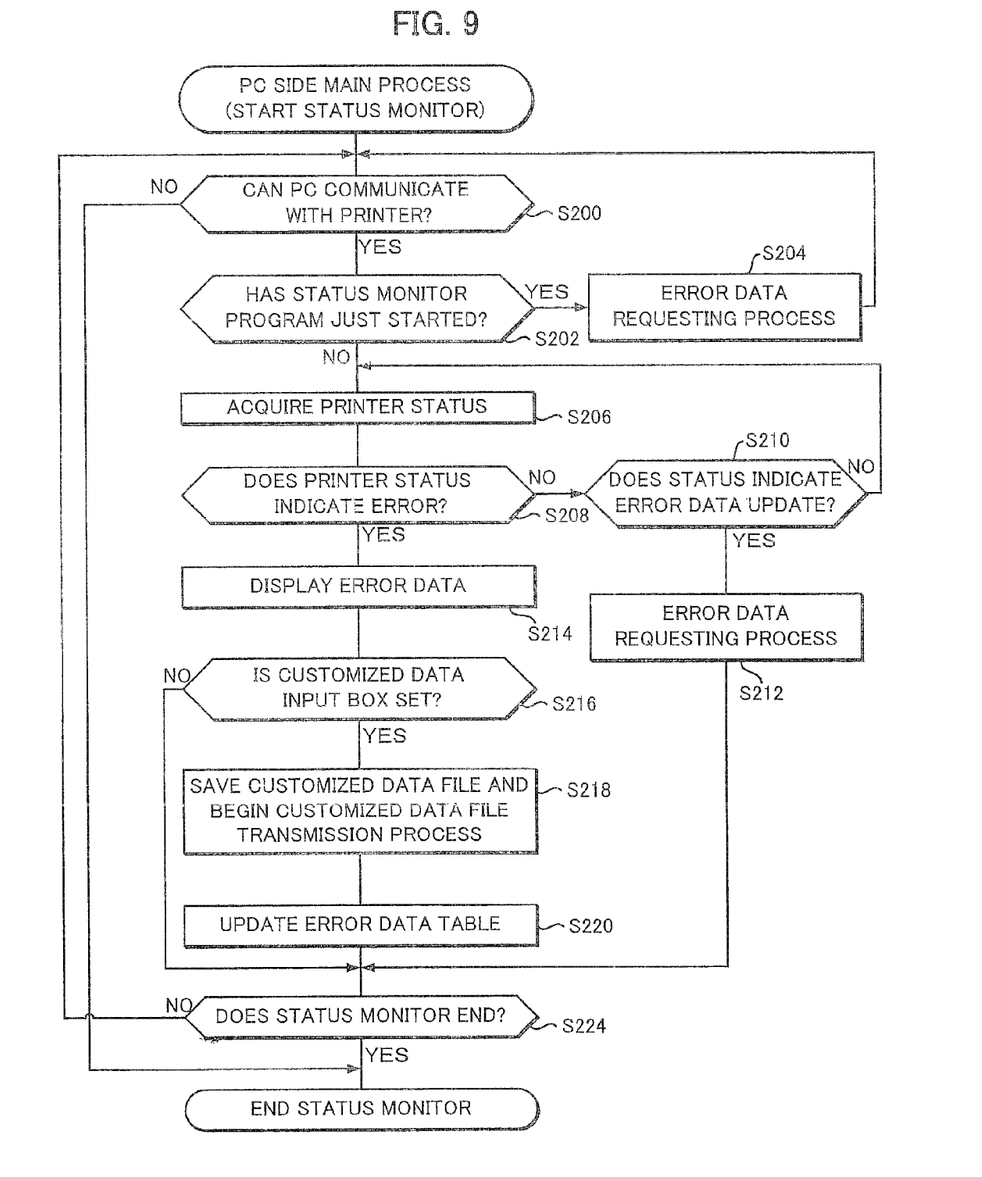
FIG. 9 is a flowchart illustrating steps in a PC-side main process performed in a second process according to the embodiment of the present invention.

The control unit 310 of the PC 300 performs the PC-side main process based on the status monitoring program 3202. The control unit 310 automatically launches the status monitoring program 3202 and begins executing this process after the power of the PC 300 is turned on and the PC 300 has started up. When the status monitoring program 3202 has been properly started, in S200 of FIG. 9 the control unit 310 determines whether or not the PC 300 can communicate with the printer 100 via the LAN cable 600. If the control unit 310 determines that communication is not possible (S200: NO), the control unit 310 ends the current process (quits the status monitoring program 3202). Communication may not be possible with the printer 100 if the power to the printer 100 is off, for example.

However, if the PC 300 can communicate with the printer 100 (S200: YES), in S202 the control unit 310 determines whether the status monitoring program 3202 has just been started. If the status monitoring program 3202 has just been started (S202: YES), in S204 the control unit 310 executes an error data requesting process shown in FIG. 10 and subsequently returns to S200. The error data requesting process will be described later. However, if the status monitoring program 3202 was not just started (S202: NO), in S206 the control unit 310 acquires the printer status of the printer 100 via the network I/F 360. The control unit 310 acquires the printer status by issuing the status request command to the printer 100 via the network I/F 360 to transmit a printer status, and subsequently controls the network I/F 360 to receive the printer status transmitted by the printer 100.

After acquiring the printer status via the network I/F 360 in S206, in S208 the control unit 310 determines whether or not the printer status acquired in S206 indicates an error. The method of determination in S208 is identical to that described in S104. If the printer status does not indicate an error (S208: NO), in S210 the control unit 310 determines whether or not the printer status acquired in S206 indicates that error data has been updated. A status related to an error data update (hereinafter referred to as an "error data update status") is transmitted by the printer 100 in a printer-side main process described later with reference to FIG. 12.

If the control unit 310 determines that the acquired printer status is not an error data update status (S210: NO), the control unit 310 returns to S206. However, if the status is an error data update status (S210: YES), in S212 the control unit 310 executes the error data requesting process shown in FIG. 10, and subsequently advances to S224. The error data requesting process of S212 is identical to that executed in S204 and will be described later in greater detail.

However, if the control unit 310 determines that the printer status acquired in S206 indicates an error (S208: YES), then the control unit 310 executes the process in S214-S224, which process is identical to S106-S114 of FIG. 8 described above except for the following points. In this process, the control unit 310 displays a dialog box 800 in which a resolution time is included in a customized data display box 8004 together with the customized data in S214 as shown in FIG. 15. A fixed data display box 8002, a customized data input box 8006, and an OK button 8008 is identical to the dialog box 700 as shown in FIG. 7, hence, the detailed description thereof will not be repeated. The resolution time indicates the time required to resolve the error corresponding to the error status code with which the customized data file is associated (identical to the error status code included in the customized data file). The control unit 110 of the printer 100 saves this resolution time in the customized data file in a resolution time measuring process described later with reference to FIG. 14. Further, in S218 the control unit 310 saves the customized data file including newly inputted customized data in the storage unit 320 as the error data 3206 and begins a customized data file transmission process described later with reference to FIG. 11. The customized data file transmission process is executed in parallel with the main process.

Error Data Requesting Process

Figure 10:
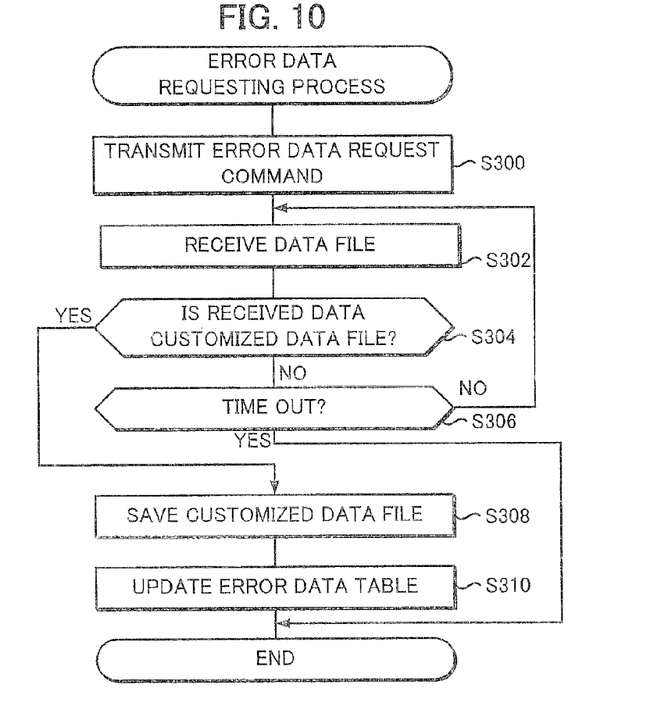
FIG. 10 is a flowchart illustrating steps in an error data requesting process performed in the second process.

At the beginning of the error data requesting process in S300 of FIG. 10, the control unit 310 controls the network I/F 360 to transmit an error data request command to the LAN cable 600 addressed to the printer 100. After transmitting the error data request command, the control unit 310 begins measuring the amount of elapsed time after transmission (the means for counting elapsed time is not shown in FIG. 2). After transmitting the request in S300, in S302 the control unit 310 acquires a file by controlling the network I/F 360 to receive data from the LAN cable 600. In S304 the control unit 310 determines whether or not the acquired file is a customized data file. If the received data is a customized data file (S304: YES), the control unit 310 advances to S308. However, if not a customized data file (S304: NO), in S306 the control unit 310 determines whether or not a predetermined time elapsed after transmitting the error data request in S300 (i.e., whether a timeout occurred). If a timeout occurred (S306: YES), the control unit 310 ends the current process. However, if a timeout did not occur (S306: NO), the control unit 310 returns to S302.

In S308 the control unit 310 saves the customized data acquired in S302 in the storage unit 320 as the error data 3206. In S310 the control unit 310 analyzes the error status code included in the customized data file, records the path for the customized data file stored in S308 in a record of the error data table 3204 that includes the corresponding error status code, and subsequently ends the current process. The processes in S308 and S310 are executed according to the same technique described above for S110 and S112 of FIG. 8 and, hence, a detailed description of these processes will not be repeated.

Customized Data File Transmission Process

Figure 11:
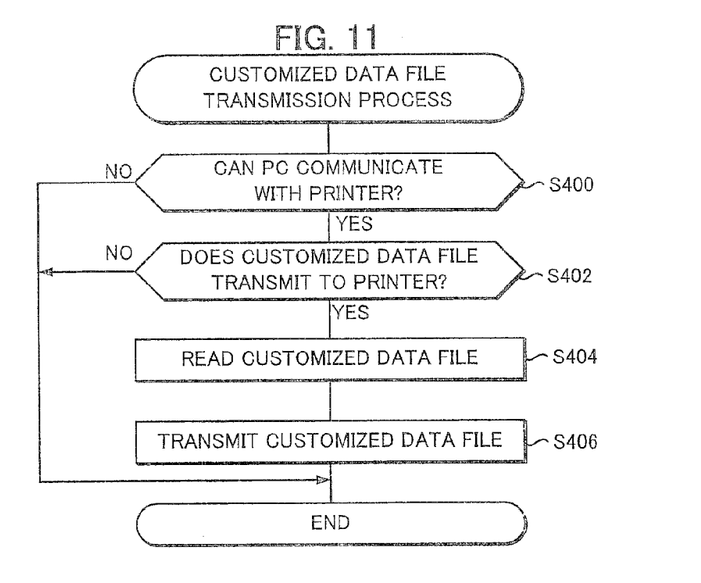
FIG. 11 is a flowchart illustrating steps in a customized data transmission process performed in the second process.

In S400 at the beginning of the customized data file transmission process of FIG. 11, the control unit 310 controls the network I/F 360 to determine whether or not the PC 300 can communicate with the printer 100. If communication is not possible (S400: NO), the control unit 310 ends the current process. However, if the PC 300 can communicate with the printer 100 (S400: YES), the control unit 310 displays a message on the display unit 330 prompting the user to indicate whether or not to transmit the customized data file newly saved in S218 of FIG. 9 to the printer, and waits for the user to input an instruction via the operating unit 340 in response to the message.

In S402 the control unit 310 determines whether or not the acquired instruction indicates the user's desire to transmit the customized data file to the printer. Here, the customized data file to be transmitted may be a file that was received and stored in a storage unit of another device which is connected to the LAN cable 600, such as the PC 400 (refer to the error data requesting process of FIG. 10 and the printer-side main process of FIG. 12). Hence, if the PC 400 received a prescribed error status code from the printer 100, the control unit of the PC 400 displays this error status code on the display unit of the PC 400.

If the instruction received from the user indicates a desire not to transmit the customized data file (S402: NO), the control unit 310 ends the current process. However, if the instruction indicates a desire to transmit the file (S402: YES), in S404 the control unit 310 reads the customized data file stored in S218 of FIG. 9, in S406 transmits the customized data file to the LAN cable 600 addressed to the printer 100, and ends the current process.

Printer-Side Main Process

Figure 12:
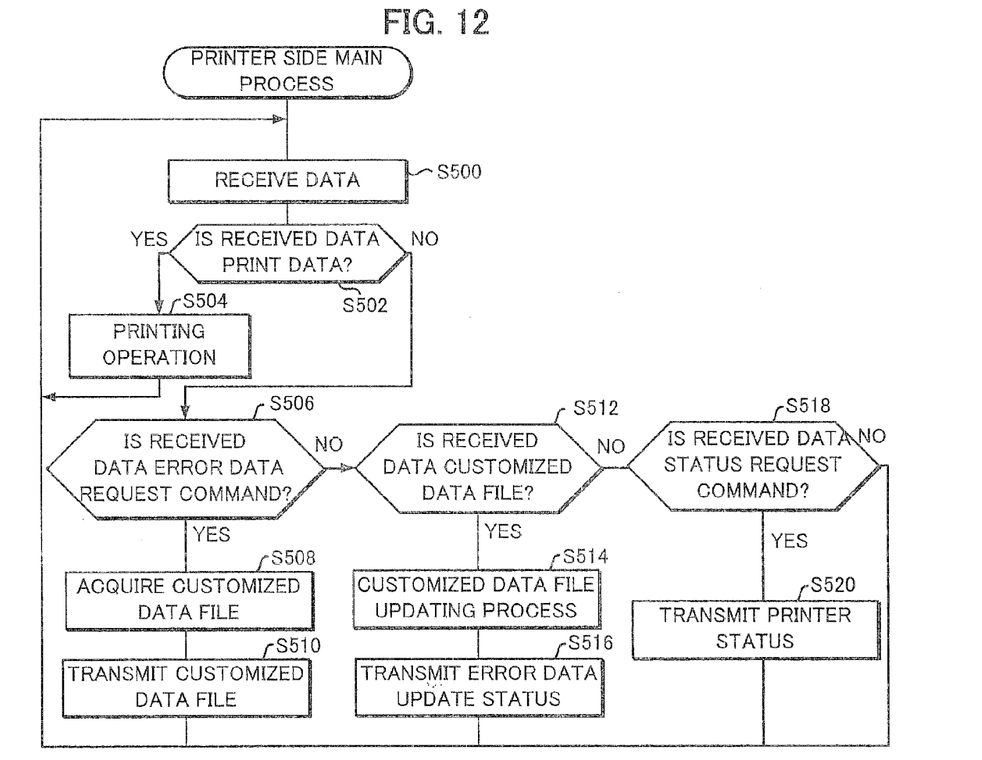
FIG. 12 is a flowchart illustrating steps in a printer-side main process performed in the second process.

The control unit 110 of the printer 100 executes the printer-side main process shown in FIG. 12 based on the programs 1202 stored in ROM or in the storage unit 120. The control unit 110 begins executing this process after the power to the printer 100 is turned on and continues to execute the process until the power is turned off.

In S500 at the beginning of the process in FIG. 12, the control unit 110 waits until data is received via the network I/F 180. After the control unit 110 receives data in S500, in S502 the control unit 110 determines whether or not the received data is print data. If the data is print data (S502: YES), in S504 the control unit 110 controls the printing unit 130 to execute a printing operation on the print data. Subsequently, the control unit 110 returns to S500. However, if the received data is not print data (S502: NO), in S506 the control unit 110 determines whether or not the data received in S500 is an error data request command. For example, in S300 of the error data requesting process described above with reference to FIG. 10, the PC 300 may transmit an error data request command to the LAN cable 600. If the control unit 110 determines that the data received in S500 is not an error data request command (S506: NO), the control unit 110 advances to S512.

However, if the data received in S500 is an error data request command (S506: YES), in S508 the control unit 110 reads the customized data file that has been stored as the error data 1206 in S604 described later from the storage unit 120 into RAM. In S510 the control unit 110 controls the network I/F 180 to transmit the customized data file to the source of the request on the LAN cable 600 (the PC 300, for example). Subsequently, the control unit 110 returns to S500.

In S512 the control unit 310 determines whether or not the data received in S500 is a customized data file. The customized data file may be a file that the PC 300 transmitted to the LAN cable 600 in S406 of the customized data file transmission process described above with reference to FIG. 11. If the received data is not a customized data file (S512: NO), the control unit 110 advances to S518. However, if the received data is a customized data file (S512: YES), in S514 the control unit 110 executes a customized data file updating process described later with reference to FIG. 13.

In S516 the control unit 110 controls the network I/F 180 to transmit a status to the LAN cable 600 indicating that the error data status has been updated, and subsequently returns to S500. The PC receives this error data update status in S206 of the PC-side main process described above with reference to FIG. 9.

If the received data is not a customized data file (S512: NO), in S518 the control unit 110 determines whether or not the data received in S500 is the status request command transmitted in S104 and S206. If the received data is not a status request command (S518: NO), the control unit 110 returns to S500. However, if the received customized data is a status request command (S518:YES), in S520 the control unit 110 controls the network I/F 180 to transmit the printer status to the source of the request on the LAN cable 600 (the PC 300, for example).

Customized Data File Updating Process

Figure 13:
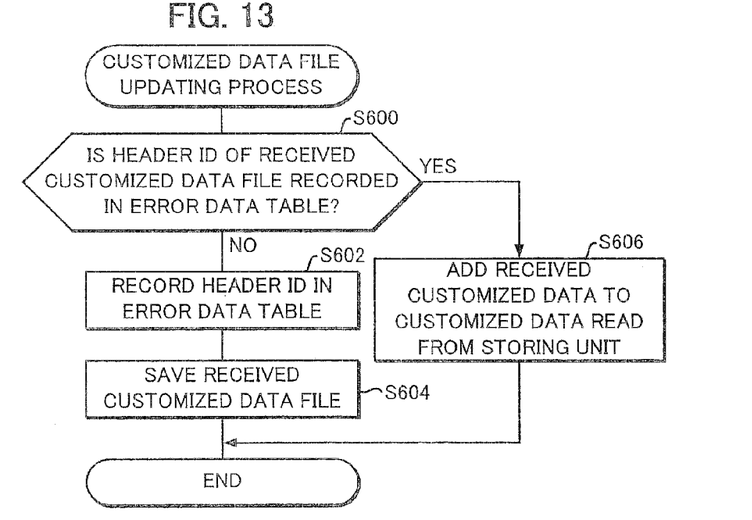
FIG. 13 is a flowchart illustrating steps in a customized data file updating process performed in the second process.

In S600 at the beginning of the customized data file updating process of FIG. 13, the control unit 110 controls the network I/F 180 to determine whether a header ID has been recorded in the error data table 1204 (see FIG. 6) in association with the same error status code included in the received customized data file. If a header ID has not been recorded in the error data table 1204 in association with this error status code (S600: NO), in S602 the control unit 110 records the header ID included in the received customized data file in the error data table 1204 in association with the same error status code included in the customized data file. In S604 the control unit 110 saves the customized data file in the storage unit 120 as the error data 1206, and subsequently ends the current process.

However, if a header ID is recorded in the error data table 1204 in association with this error status code (S600:YES), in S606 the control unit 110 reads the customized data file including the header ID recorded in association with the same error status code included in the received customized data file from the storage unit 120 and adds the customize data included in the received customized data file to the file read from the storage unit 120. Subsequently, the control unit 110 ends the current process.

To give a specific example, if a customized data file including the customized data "10 boxes of paper purchased on 8/26/2008. Stored in locker on the $3^{rd}$ floor." is currently stored in the storage unit 120 as the error data 1206, in S606 the control unit 110 reads this customized data file from the storage unit 120, adds the customized data "Purchase more paper from http://www.paper123.com/. Login ID is aaaa; password is bbbb." in the customized data file received in S500 of FIG. 12 to create the new customized data "Purchase more paper from http://www.paper123.com/. Login ID is aaaa; password is bbbb./ 10 boxes of paper purchased on 8/26/2008. Stored in locker on the $3^{rd}$ floor." and saves this new customized data file in the storage unit 120 as the error data 1206 (overwrites the existing error data 1206). At the same time, the control unit 110 updates the username included in the customized data file currently stored in the storage unit 120 to the username included in the customized data file received in S500.

Resolution Time Measuring Process

Figure 14:
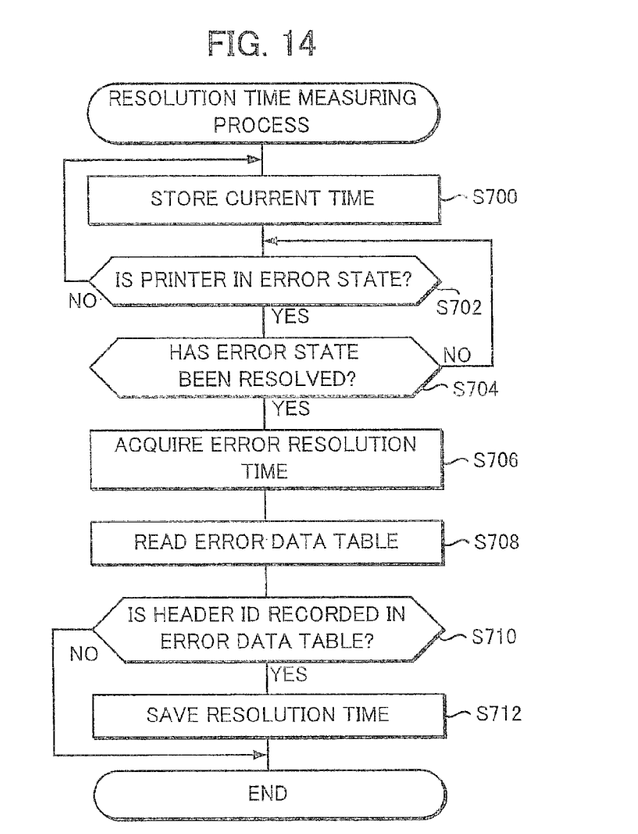
FIG. 14 is a flowchart illustrating steps in a resolution time counting process performed in the second process.
Figure 15:
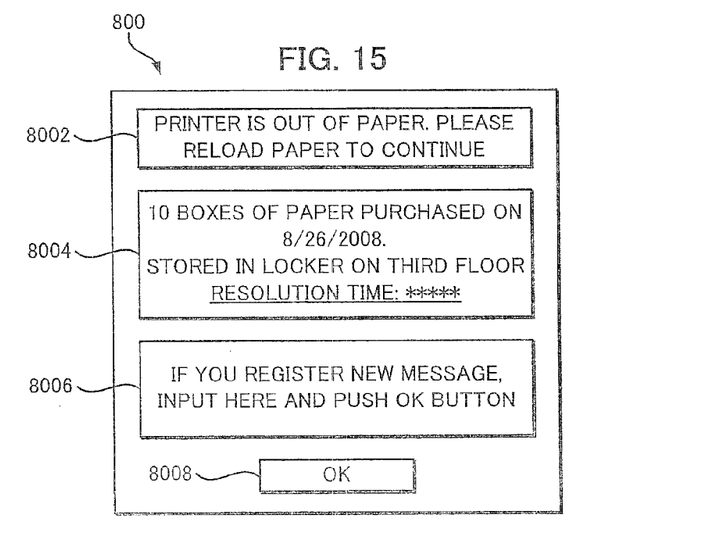
FIG. 15 is an explanatory diagram showing a dialog box displayed on the personal computer in the second process.

As with the printer-side main process described in FIG. 12, the control unit 110 of the printer 100 executes the resolution time measuring process of FIG. 14 based on the programs 1202 stored in ROM or in the storage unit 120. The control unit 110 executes this process in parallel with the printer-side main process after the power of the printer 100 is turned on and continuously until the power is turned off.

In S700 of the process shown in FIG. 14, the control unit 110 stores the current time measured by the timer 140. In S702 the control unit 110 determines whether or not the sensors provided in the printer 100 have detected an error, i.e., whether or not the printer 100 is in an error state. If the printer 100 is not in an error state (S702: NO), the control unit 110 returns to S700. However, if the printer 100 is in an error state (S702:YES), in S704 the control unit 110 determines whether or not the error state has been resolved. The control unit 110 continually loops back to S702 while the error status has not been resolved (S704: NO). When the error status has been resolved (S704:YES), in S706 the control unit 110 calculates the time required to resolve the error based on the time measured by the timer 140 to acquire the resolution time. In S708 the control unit 110 reads the error data table 1204 from the storage unit 120 into RAM provided on the printer 100. Subsequently, the control unit 110 advances to S710.

In S710 the control unit 110 determines whether or not the header ID of the customized data file associated with the error status code identifying the error status detected in S702 is recorded in the error data table 1204. If this header ID is not recorded in the error data table 1204 (S710: NO), the control unit 110 ends the current process. However, if the header ID is recorded in the error data table 1204 (S710:YES), in S712 the control unit 110 reads the customized data file based on the recorded header ID and saves the resolution time acquired in S706 as the resolution time included in the customized data file (see FIG. 4). Subsequently, the control unit 110 ends the current process.

Since the second process of the embodiment can display the dialog box 800 as shown in FIG. 15, the same advantages and effects can be obtained through both processes.

The second process involves both the customized data file transmission process shown in FIG. 11 and the error data requesting process shown in FIG. 10. In this way, the PC 400, for example, can acquire a customized data file via the printer 100, which customized data file includes customized data inputted on the PC 300, and can therefore display a message on the PC 400 based on customized data inputted in the PC 300. Hence, if an error occurs when the PC 400 is instructing the printer 100 to execute a printing operation, the user of the PC 400 can be directed to take quick and appropriate measures to resolve the error based on customized data inputted into the PC 300 when the same occurred.

The second process also involves measuring the time required for resolving an error in the process described in FIG. 14 and displaying this resolution time in the customized data display box 8004 of the dialog box 800 as shown in FIG. 15. Accordingly, the user can gain a general understanding of how much time is required to resolve the error.

While the invention has been described in detail with reference to specific embodiment thereof, if would be apparent to those skilled in the art that many modifications and variations may be made therein without departing from the spirit or the invention, the scope of which is defined by the attached claims.

In the embodiment, the printer 100 executes the process shown in FIGS. 12, 13, and 14. However, other electrical equipment, such as a facsimile, a scanner, and a multi-function peripheral, is connected may execute the process shown in FIGS. 12, 13, and 14.

Figure 8:
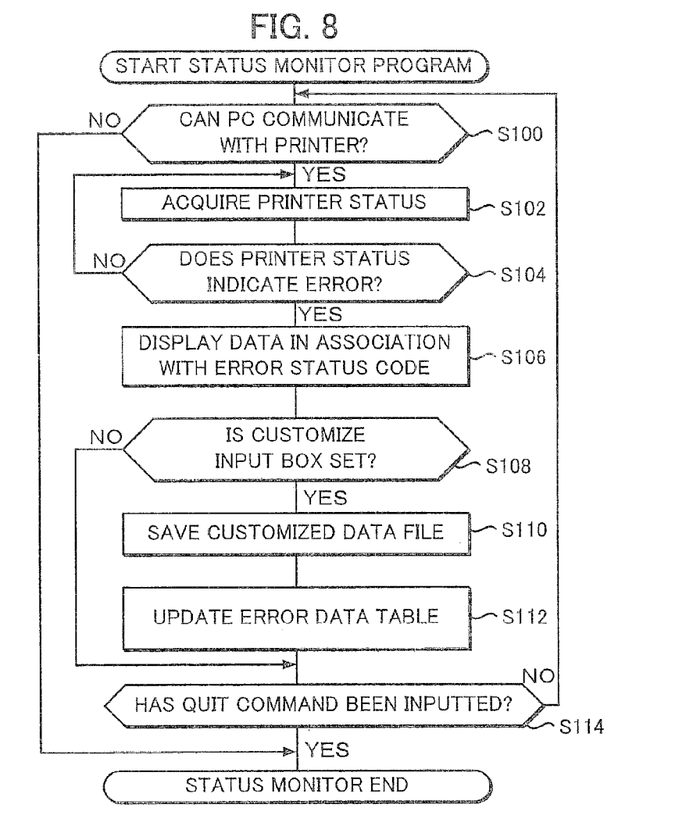
FIG. 8 is a flowchart illustrating steps in a first process implemented by a status monitoring program.

In the embodiment, the PC 200 executes the process in FIG. 8. However, the control unit 110 of the printer 100 may be configured to execute the same process. This configuration requires that the printer 100 store the programs 1202 in the storage unit 120 that is equivalent to the status monitoring program 2202 stored on the PC 200, as well as the error data table 1204 equivalent to the error data table 2204 shown in FIG. 5, and fixed data files and customized data files.

In brief, when sensors provided in the printer 100 detect a prescribed status (note: steps equivalent to S100 and S102 are not implemented), in a step equivalent to S104 the control unit 110 determines whether the detected status indicates an error. If the status indicates an error (S104: YES), in a step equivalent to S106 the control unit 110 displays the dialog box 700 shown in FIG. 7 on the display unit 150. The remaining process executed by the control unit 110 is identical to the process executed by the control unit 210 of the PC 200 described above.

What is claimed is:

1. A data processor comprising:
   a communication unit that is configured to perform data communication with an electrical equipment;
   a customized data acquiring unit that is configured to acquire customized data inputted by a user;
   a storing unit that is configured to store a plurality of fixed data respectively associated in advance with a plurality of error status data identifying errors occurred in the electrical equipment, and at least one customized data acquired by the customized data acquiring unit, each of the at least one customized data being correlated with a respective error status data, each of the plurality of fixed data indicating predetermined steps to take in response to each error, respectively, the at least one customized data being additionally stored in the storing unit;
   a status data acquiring unit that is configured to acquire the error status data from the electrical equipment via the communication unit; and
   a display unit that is configured to display the fixed data and the at least one customized data correlated with the error status data acquired by the status data acquiring unit, the display unit displaying a customized data input interface for inputting specific customized data when the status data acquiring unit acquires specific error status data, the customized data acquiring unit being configured to acquire the specific customized data inputted via the customized data input interface, and
   wherein the specific customized data acquired by the customized data acquiring unit is added to a corresponding at least one customized data as a member and stored in the storing unit so as to be correlated with the specific error status data which is acquired by the status data acquiring unit upon displaying the customized data input interface, wherein after the specific customized data is stored in the storing unit, the specific customized data is displayed in the displaying unit when the status data acquiring unit acquires the specific error status data.

2. The data processor according to claim 1, wherein the customized data input interface is a graphical user interface displayed in the display unit to allow the user to input the specific customized data.

3. The data processor according to claim 2, further comprising an operating unit that is configured to input text data, wherein the customized data input interface has a display region for displaying a text data inputted via the operating unit.

4. The data processor according to claim 3, wherein the specific customized data is created by inputting text data in the input region and acquired by the customized data acquiring unit.

5. The data processor according to claim 1, wherein the display unit displays the fixed data and the specific customized data when the specific error status data is acquired by the status data acquiring unit.

6. The processor according to claim 1, wherein when the user inputs in the customized data input interface other customized data correlated with the specific error status data, the customized data acquiring unit acquires the other customized data, and the storing unit stores the other customized data and adds the other customized data to the at least one customized data correlated with the specific error status data as a member, where the specific customized data is another member of the at least one customized data correlated with the specific error status data.

7. The processor according to claim 1, wherein when the user inputs in the customized data input interface other customized data correlated with the specific error status data, the customized data acquiring unit acquires the other customized data, and the storing unit stores the other customized data and adds the other customized data to the at least one customized data correlated with the specific error status data as a member, where the specific customized data is another member of the at least one customized data correlated with the specific error status data such that the display unit displays the customized data following the other customized data.

8. The processor according to claim 1, wherein the display unit is configured to display a display window including a fixed data display region for displaying the fixed data, a customized data display region for displaying the at least one customized data, and the customized data input interface, the customized data display region being displayed below the fixed data display region.

9. The data processor according to claim 1, further comprising:
   a customized data transmitting unit configured to transmit prescribed customized data to the electrical equipment when the prescribed customized data is acquired by the customized data acquiring unit;
   a customized data requesting unit configured to transmit a customized data request to the electrical equipment, the customized data request indicating a request for transmitting customized data that is stored in the electrical equipment; and
   a customized data receiving unit configured to receive the customized data transmitted from the electrical equipment in response to the customized data request, wherein the storing unit stores the customized data received by the customized data receiving unit correlated with an error status data which corresponds to the customized data, thereby updating the at least one customized data.

10. A printing system comprising:
    a plurality of data processors; and an electrical equipment, the plurality of data processors comprising:
    a communication unit that is configured to perform data communication with the electrical equipment;
    a customized data acquiring unit that is configured to acquire customized data inputted by a user;
    a storing unit that is configured to store a plurality of fixed data respectively associated in advance with a plurality of error status data identifying errors occurred in the electrical equipment, and at least one customized data acquired by the customized data acquiring unit, each of the at least one customized data being correlated with an respective error status data, the fixed data indicating predetermined steps to take in response to each error, respectively, the at least one customized data being additionally stored in the storing unit; and
    a status data acquiring unit that is configured to acquire the error status data from the electrical equipment via the communication unit;

a display unit that is configured to display the fixed data and the at least one customized data correlated with the error status data acquired by the status data acquiring unit, the display unit displaying a customized data input interface for inputting specific customized data when the status data acquiring unit acquires specific error status data, the customized data acquiring unit being configured to acquire the specific customized data inputted via the customized data input interface, wherein the specific customized data acquired by the customized data acquiring unit is added to a corresponding at least one customized data as a member and stored in the storing unit so as to be correlated with the specific error status data which is acquired by the status data acquiring unit upon displaying the customized data input interface, wherein after the specific customized data is stored in the storing unit, the specific customized data is displayed on the display unit when the status data acquiring unit acquires the corresponding error status data, the electrical equipment comprising:

an electrical-equipment-side communication unit that is configured to perform data communication with the plurality of data processors;

a transmitting unit that transmits the error status data to at least one of data processors;

a receiving unit that is configured to receive customized data from a second data processor, the second data processor transmitting customized data when the second data processor receives the error status data transmitted by the transmitting unit; and;

a electrical-equipment-side storing unit that stores the customized data received by the receiving unit; and the transmitting unit being configured to transmit the customized data to a first data processor when the receiving unit receives a customized data request from the first data processor, the customized data transmitted by the transmitting unit being in association with the error status data.

11. The printing system according to claim 10, the electrical equipment further comprising: a sensor that is configured to sense an error occurred in the electrical equipment; and a timer that measures an elapsed from the occurrence of the error to the resolution of the error, wherein the second transmitting unit transmits the customized data together with the time measured by the timer, wherein the display unit that displays the time transmitted from the second transmitting unit when the display unit display the fixed data and the at least one customized data.

12. The printing system according to claim 10, wherein the plurality of data processors further comprises:

a customized data transmitting unit configured to transmit prescribed customized data to the receiving unit of the electrical equipment when the prescribed customized data is acquired by the customized data acquiring unit, the electrical-equipment-side storing unit storing the prescribed customized data to update customized data stored therein;

a customized data requesting unit configured to transmit a customized data request to the receiving unit of the electrical equipment, the customized data request indicating a request for transmitting customized data that is stored in the electrical equipment; and a customized data receiving unit configured to receive the customized data transmitted from the transmitting unit of the electrical equipment in response to the customized data request, wherein the storing unit stores the customized data received by the customized data receiving unit correlated with an error status data which corresponds to the customized data, thereby updating the at least one customized data.

13. A non-transitory computer readable storage medium storing a set of program instructions installed on and executed by a computer for controlling a data processor, the program instructions comprising:

communicating with an electrical equipment;

first acquiring customized data inputted by a user;

storing a plurality of fixed data respectively associated in advance with a plurality of error status data identifying errors occurred in the electrical equipment, and at least one customized data acquired by the first acquisition, each of the at least one customized data being correlated with an respective error status data, the fixed data indicating predetermined steps to take in response to each error, respectively, the at least one customized data being additionally stored;

second acquiring the error status data from the electrical equipment via the communication; and displaying the fixed data and the at least one customized data correlated with the error status data acquired by the second acquisition, the display displaying a customized data input interface for inputting specific customized data when the second acquisition acquires specific error status data, and the first acquisition being configured to acquire the specific customized data inputted via the customized data input interface, and wherein the specific customized data acquired by the first acquisition is added to a corresponding at least one customized data as a member and stored so as to be correlated with the specific error status data which is acquired by the second acquisition upon displaying the customized data input interface, wherein after the specific customized data is stored, the specific customized data is displayed on the display when the second acquisition acquires the corresponding error status data.

14. The non-transitory computer readable storage medium according to claim 13, wherein the customized data input interface is a graphical user interface displayed in the display to allow the user to input the specific customized data.

15. The non-transitory computer readable storage medium according to claim 14, further comprising inputting text data, wherein the specific customized data input interface has a display region for displaying a text data inputted via the input.

16. The non-transitory computer readable storage medium according to claim 15, wherein the specific customized data is created by inputting text data in the input region and acquired by the first acquisition.

17. The non-transitory computer readable storage medium according to claim 13, wherein the display displays the fixed data and the specific customized data when the specific error status data is acquired by the second acquisition.

18. The non-transitory computer readable storage medium according to claim 13, wherein when the user inputs in the customized data input interface other customized data correlated with the specific error status data, the first acquisition acquires the other customized data, the other customized data is stored and is added to the at least one customized data correlated with the specific error status data as a member, where the specific customized data is another member of the at least one customized data correlated with the specific error status data.

19. The non-transitory computer readable storage medium according to claim 13, wherein when the user inputs in the customized data input interface other customized data correlated with the specific error status data, the first acquisition acquires the other customized data, the other customized data is stored and is added to the at least one customized data correlated with the specific error status data as a member, where the specific customized data is another member of the at least one sets of customized data correlated with the specific error status data such that the display unit displays the specific customized data following the other customized data.

20. The non-transitory computer readable storage medium according to claim 13, wherein the display is configured to display a display window including a fixed data display region for displaying the fixed data, a customized data display region for displaying the at least one customized data, and the customized data input interface, the customized data display region being displayed below the fixed data display region.

21. A method for monitoring an electrical equipment status on a data processor, the method comprising:
 communicating with an electrical equipment;
 first acquiring specific customized data inputted by a user;
 storing a plurality of fixed data respectively associated in advance with a plurality of error status data identifying errors occurred in the electrical equipment and at least one customized data acquired by the first acquisition, the at least one customized data being correlated with a respective error status data, the fixed data indicating predetermined steps to take in response to each error, respectively, the at least one customized data being additionally stored to the fixed data;
 second acquiring the error status data from the electrical equipment via the communication, the status data indicating a status of the electrical equipment; and
 displaying the fixed data and the at least one customized data correlated with the error status data acquired by the second acquisition, the display displaying a customized data input interface for inputting specific customized data when the second acquisition acquires specific error status data, and the first acquisition being configured to acquire the specific customized data inputted via the customized data input interface, and
 wherein the specific customized data acquired by the first acquisition is added to a corresponding at least one customized data as a member and stored so as to be correlated with the specific error status data which is acquired by the second acquisition upon displaying the customized data input interface, wherein after the specific customized data is stored, the specific customized data is displayed on the display when the second acquisition acquires the corresponding error status data.

\* \* \* \* \*